April 2, 1929.  F. H. TOWLER ET AL  1,707,314
BALING OR BUNDLING PRESS
Filed April 4, 1924   7 Sheets-Sheet 1
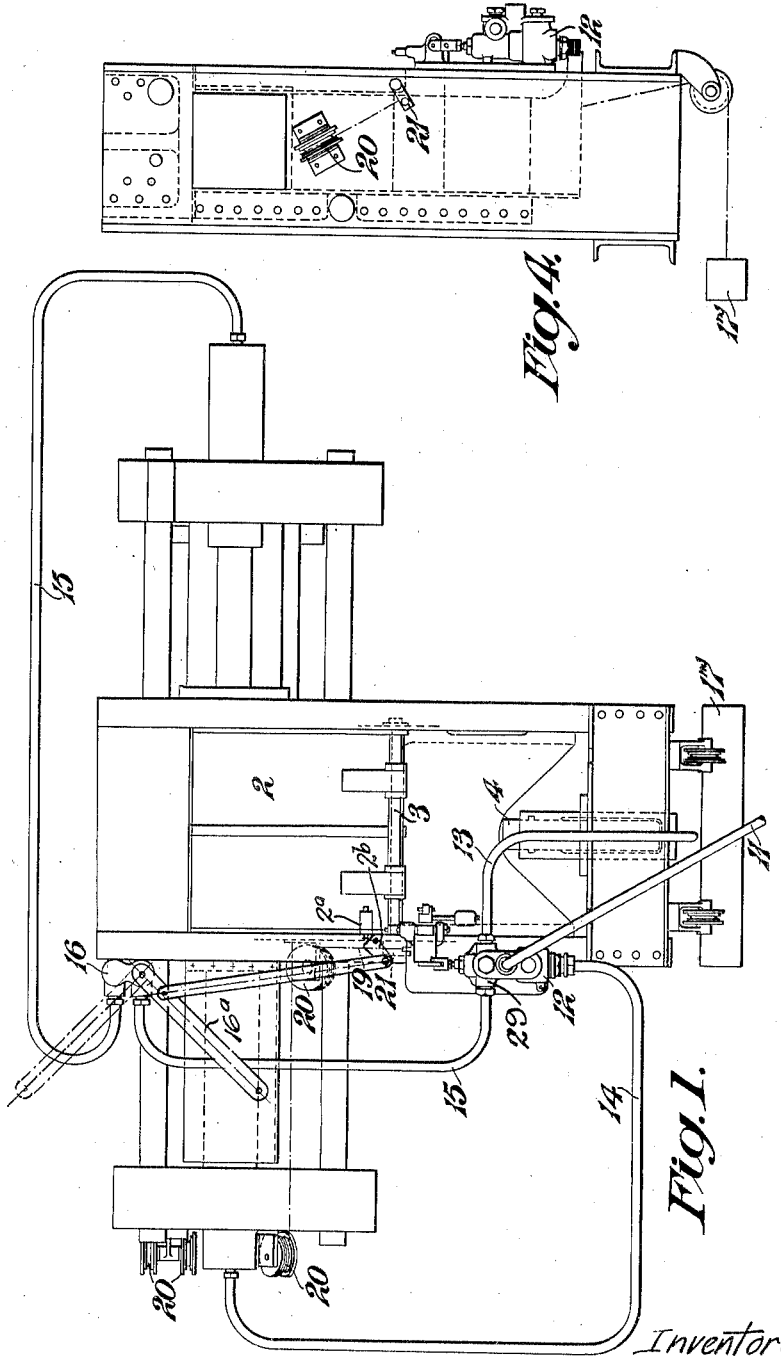

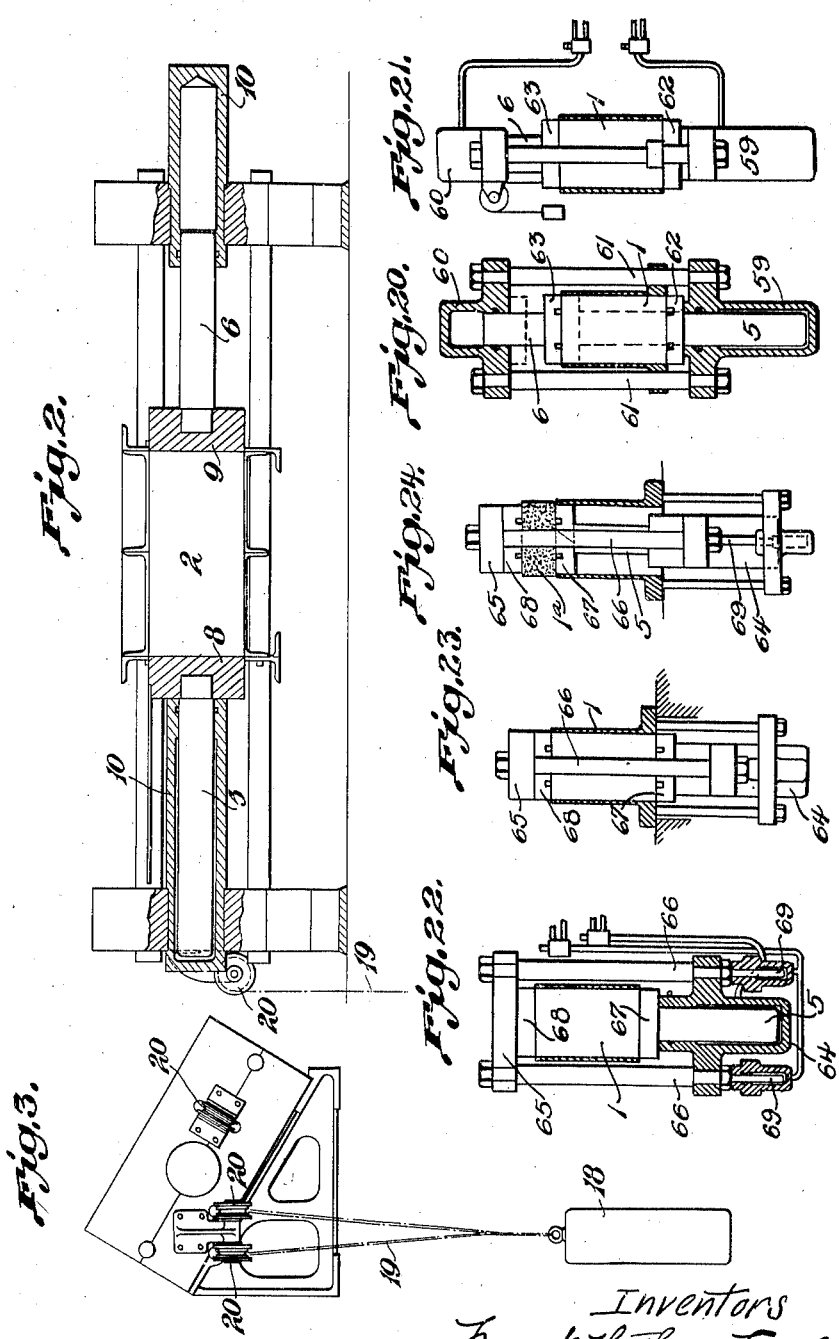

April 2, 1929.    F. H. TOWLER ET AL    1,707,314
BALING OR BUNDLING PRESS
Filed April 4, 1924    7 Sheets-Sheet 3

Inventors
Frank Hathorn Towler
and John Maurice Towler

April 2, 1929.  F. H. TOWLER ET AL  1,707,314
BALING OR BUNDLING PRESS
Filed April 4, 1924   7 Sheets-Sheet 4

Inventors
Frank Hathorn Fowler
and John Maurice Fowler
by P. Singer
Atty

April 2, 1929.  F. H. TOWLER ET AL  1,707,314
BALING OR BUNDLING PRESS
Filed April 4, 1924   7 Sheets-Sheet 5
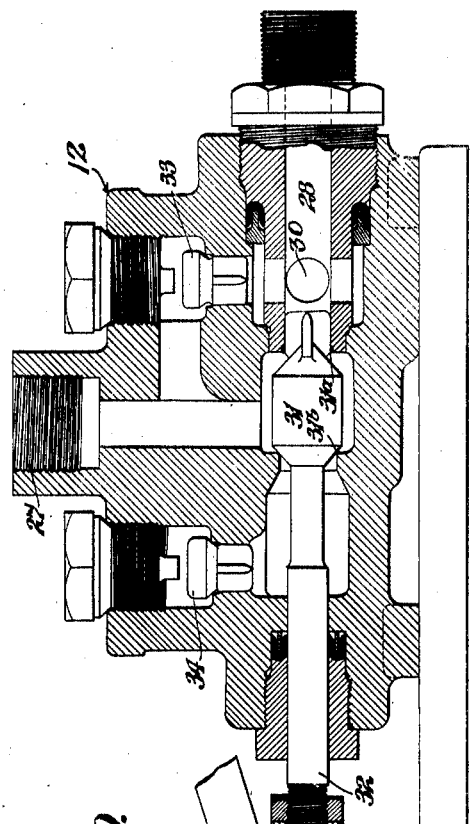
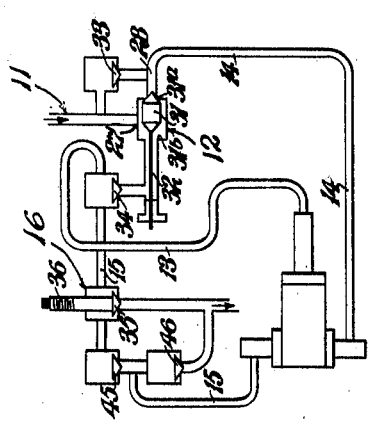

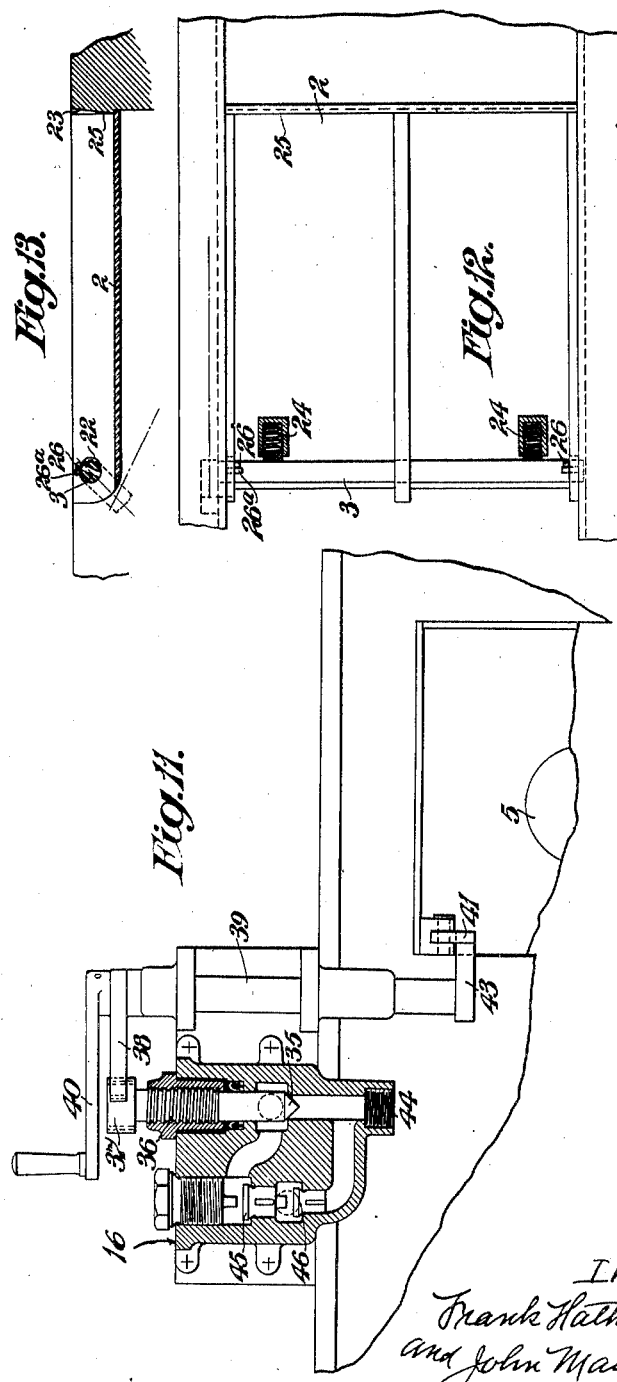

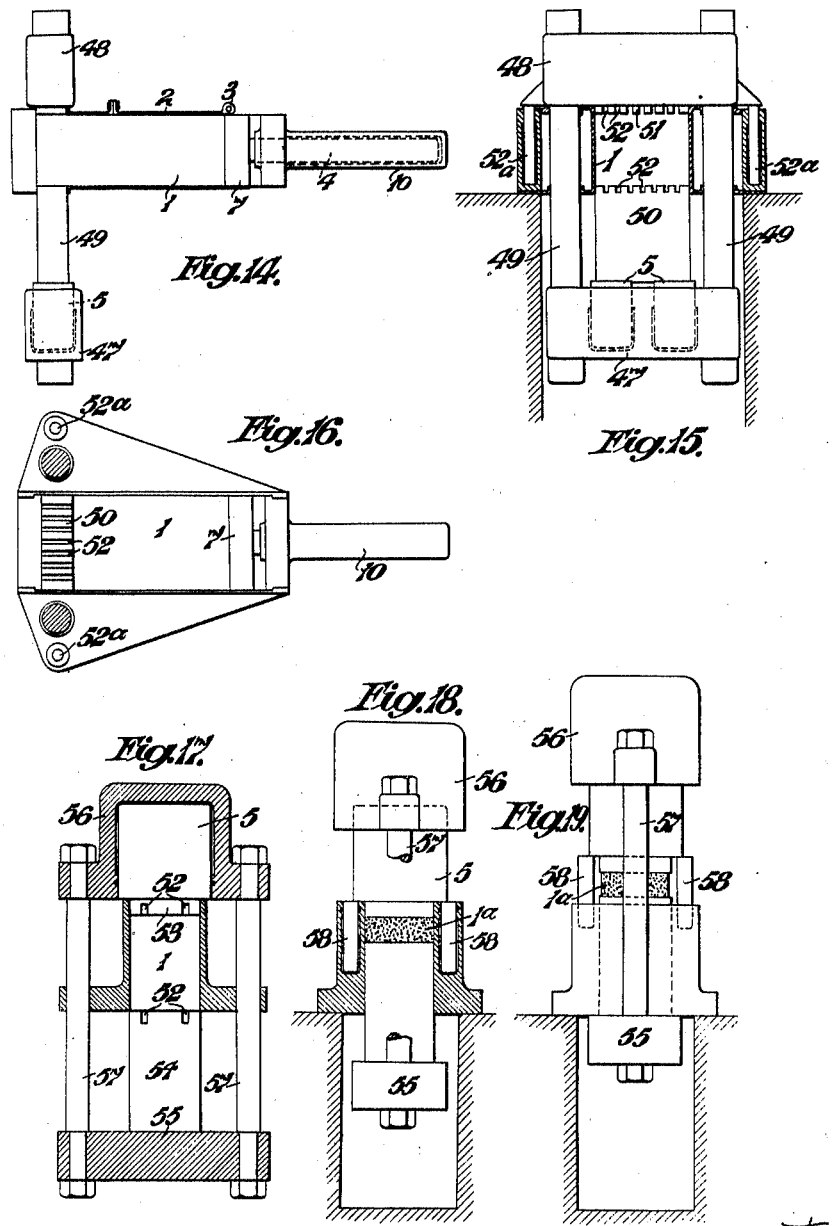

Patented Apr. 2, 1929.

1,707,314

UNITED STATES PATENT OFFICE.

FRANK HATHORN TOWLER AND JOHN MAURICE TOWLER, OF ILKLEY, ENGLAND.

BALING OR BUNDLING PRESS.

Application filed April 4, 1924, Serial No. 704,230, and in Great Britain April 5, 1923.

This invention relates to presses, and it has for its object to provide an improved device of this character which is capable of compressing into bales or bundles light metal scrap, cotton, wool, and other suitable materials which have to be compressed in an enclosed space or box.

The present invention consists broadly of a baling or bundling press wherein the material is finally or partially compressed in an enclosed space or box and finally freed from such space or box whilst held, either loosely or under compression, between a pair of opposed platens.

In the case of cotton, wool, and other materials, which are not self-binding, the bale or bundle is maintained under compression between the opposed platens when being freed from the enclosed space or box and whilst so held secured by lashings, but in the case of light metal scrap and other self-binding materials the pressure exerted by the platens need be only just sufficient to hold the bale or bundle during the operation of freeing the same from the enclosed space or box.

The operation of freeing the bale or bundle from the enclosed space or box may be effected either by moving the opposed platens away from the enclosed space or box with the bale or bundle between them or by moving the enclosed space or box away from the platens.

In the practical application of the invention the compression of the material may be conveniently effected by means of hydraulic rams, the admission of fluid to, and its release from, such rams being preferably controlled automatically although of course the invention may be equally carried into effect by providing manually operated controls for the pressure fluid.

In order that the invention may be clearly understood, several embodiments of the same will now be described, by way of example, by aid of the accompanying drawings, in which:—

Figure 1 is a plan view of a press, constituing one embodiment of the invention, designed to be operated entirely automatically with the exception only of the charging of the compression chamber with the material to be baled, and comprising three hydraulic rams—a filling ram, a compressing ram and a buffer ram.

Figure 2 is a longitudinal section of the same through the compressing and buffer rams.

Figure 3 is an end view thereof looking towards the compressing ram.

Figure 4 is a side elevation looking towards the left hand side of Figure 1.

Figure 9 is a diagrammatic view of the piping system and valves for controlling automatically the operations of the rams.

Figure 10 is an enlarged sectional view of one of the pressure fluid control valves.

Figure 11 is a similar view of the other pressure fluid control valve.

Figure 12 is a plan view, to an enlarged scale of the lid to cover the aperture in the compressing chamber through which the material is inserted.

Figure 13 is a longitudinal section through the same showing the means employed for obtaining automatically the locking and releasing of the door before and after the completion of a bale.

Figure 14 is a side elevation, somewhat diagrammatic, of a modified form of press in which the buffer ram is dispensed with, a cross head operatively associated with the cylinders of the compressing rams taking its place, the freeing of the completed bale or bundle being effected by raising this cross head by means of small ejecting rams.

Figure 15 is a part vertical section of this modified form of press looking towards the compressing rams and cross head and illustrating its adaptation for the baling or bundling of cotton, wool, and other non-self-binding materials.

Figure 16 is a plan view of the same similar to Figure 14 but showing the compression chamber lid and the cross head removed.

Figures 17 and 18 illustrate in front and side sectional views a modification of the cross head type of press illustrated in Figures 14 to 16, Figure 17 showing the position of the parts before compression of the material and Figure 18 the positions of the parts after compression of the material.

Figure 19 is a view similar to Figure 18 but showing the positions of the parts when the completed bale is freed from the compression chamber.

Figure 20 is a part sectional elevation of a still further modified form of press in which the cross head shown in Figures 14 to 16 is replaced by a buffer ram.

Figure 21 is a view taken at right angles to Figure 20.

Figure 22 is a part sectional elevation of a further modification of the cross head type of press in which compression of the material is effected between the platen of a compressing ram and an opposed platen carried by the cross head, the freeing of the bale being effected by means of small ejecting rams.

Figure 24 is a similar view to Figure 23 but showing the relative positions of the parts when the bale is freed from the compressing chamber.

Figure 25 is a fragmentary view of the lid with the latching means in section.

Figure 5:
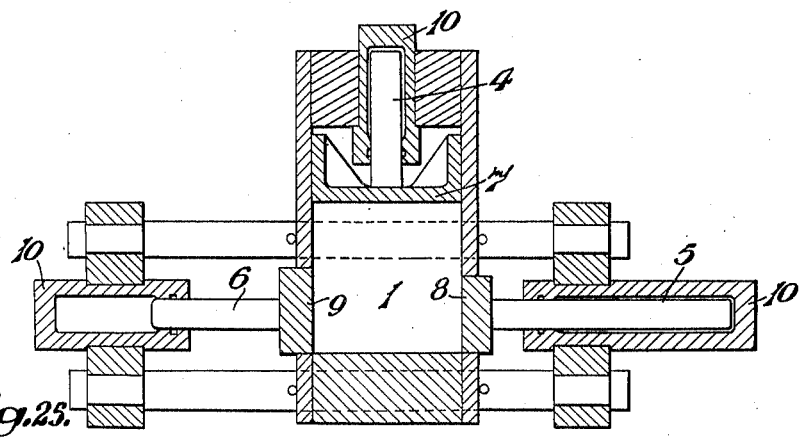
Figures 5 to 8 are diagrammatic sectional views showing the relative positions of the rams during a working cycle.

Referring to the drawings and particularly to Figures 1 to 13 the press illustrated comprises a compression chamber 1 the top side of which is formed with an opening through which the material to be baled is fed, which opening is normally closed by means of a door 2, which is mounted to turn about a hinge pin 3. This door in a manner hereinafter to be explained is opened automatically when each completed bale has been or is being ejected and closed automatically at the commencement of the movement of the filling ram.

The means for compressing the material in the press illustrated in Figures 1 to 13 comprises three hydraulic rams—a filling ram 4, a compressing ram 5 and a buffer ram 6. Each of these rams is provided with an enlarged head or platen 7, 8, and 9 respectively, which are mounted to slide in and through the compression chamber 1. These rams work within cylinders 10 to the interiors of which working or pressure fluid is supplied from a continuously running pump not shown. The supply pipe 11 for the pressure fluid from the pump connects with a distributing valve 12, see Figures 1 and 10, from whence it is distributed to the cylinders of the filling, compressing, and buffer rams, by way of the pipes 13, 14, and 15 respectively.

The supply of working fluid to and from the buffer ram is further controlled by a valve 16, see Figures 1 and 11, which serves, in the present example, to automatically release the pressure from the buffer ram when it is desired to eject a completed bale.

The distributing valve 12, in the example illustrated, is operated by a weighted lever 17 which is thrown over on the completion of the stroke of the filling ram by a chain or rod connection between the lever 17 and the filling ram which connection is not shown in the drawings. The lever 17 is thrown back automatically to the original position again by engagement with the door 2 when the latter is raised on the completion of the ejection of the bale.

Any other means of operating this valve may be employed and further forward movement of the filling ram may be prevented by providing the same with some sort of positive stop.

The door 2 is raised automatically by means of a chain 19 passing over pulleys 20 and serving to connect a crank 21 on one end of the hinge pin 3 to the compressing ram 5 so that the final inward movement of the ram serves to turn the hinge pin and raise the lid, and when so raised is held in that position during the filling of the compression chamber by means of a catch indicated at 2$^a$ in Figures 1 and 25.

This catch which is spring pressed by a spring 3$^a$ is released by means of a cam 2$^b$ which is connected to the lever 16$^a$ of valve 16 so that when the valve is closed the catch is released and the door drops of its own weight.

Figure 26:
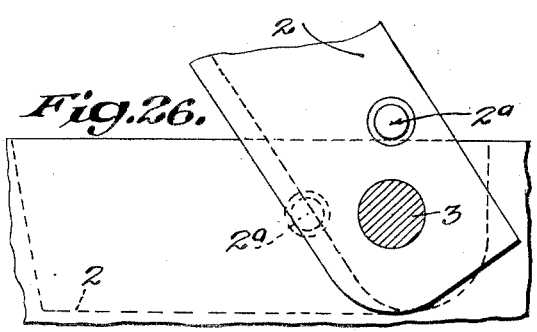
Figure 26 is a view on line 26—26 of Figure 25 with the lid in an open position.

In Figure 25 the second or released position of the catch is shown in dotted lines while the latched position is shown in full lines. In Figure 26 the open position of the lid 2 is shown in full lines and the closed position in dotted lines.

To enable this door to automatically lock itself the holes 22 through which the hinge pin 3 passes are elongated or alternatively the sockets in the frame in which the ends of the hinge pin rest are elongated whilst the end of the compression chamber is formed with an inclined surface 23 against which the door is caused to slide back against buffer springs 24 until the end of the door comes below a projecting ledge 25 when it springs forward beneath the ledge under the influence of the buffer springs and is thereby locked. These buffer springs in the alternative arrangement may be locked in recesses in the frame behind the respective ends of the hinge pin. The door is prevented from falling any further by means of stops not shown, which engage with or are carried by a convenient part of the compression chamber.

As before stated the door is raised by the final movement of the compressing ram in ejecting the bale. This movement is also utilized to unlock the door, the means shown for this purpose consisting of projections 26 on the hinge pin 3 and engaging pins or lugs 26$^a$ on the door. The turning of the hinge pin thus serves to first pull back the door until the end is clear of the projecting ledge 25 and then raise the door until the same is engaged by the aforementioned catch, and the lever 17 of the valve 12 has been thrown over.

It will thus be seen that the valve 12 is operated automatically by the filling ram and the door respectively.

The valve 12, see Figure 10, comprises an inlet 27 which is connected to a continuously running pump not shown, an outlet 28 see Figure 10, which is connected by the pipe 14 to the compressing ram, a further outlet 29 see also Figure 10, which is connected to the valve 16 and from thence to the buffer ram by way of the pipes 15 and an outlet 30 which is connected to the filling ram by way of the pipe 13. The fluid entering the inlet 27 is controlled on its way to the several outlets by means of a double mitre valve 31, the spindle 32 of which is operated by the weighted lever 17. Non-return valves 33 and 34 are also provided for a purpose hereafter to be explained.

The valve 16 comprises in the example shown in Figure 11 a valve 35 of the needle type having a screwed shank 36 and a small toothed pinion 37 mounted upon its upper end with which meshes a toothed sector 38 mounted upon the upper end of a spindle 39. This spindle is operated either manually by means of a handle 40 or automatically by means of a tappet 41 carried by the compressing ram 5, and a co-acting crank arm 43 mounted upon the lower end of the spindle 39. The operation of the spindle 39 serves to open or close the valve 35. When the valve 35 is open the pressure fluid from the cylinders of the filling and buffer rams is allowed to flow back past the valve 35 and through the passage 44 to the supply tank not shown.

Figure 6:
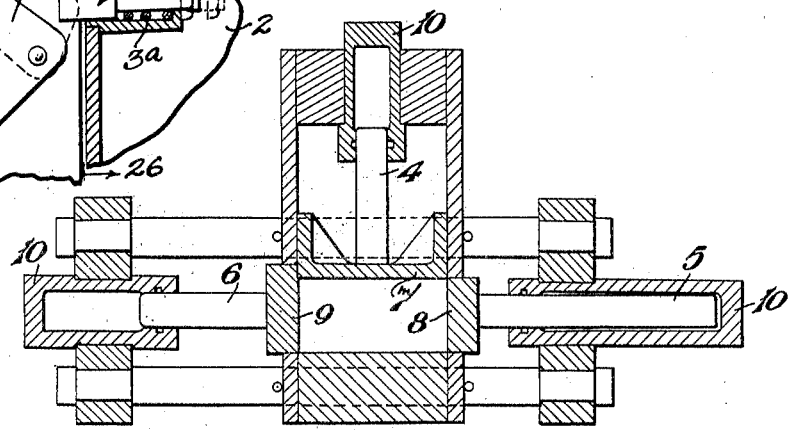
Figure 7:
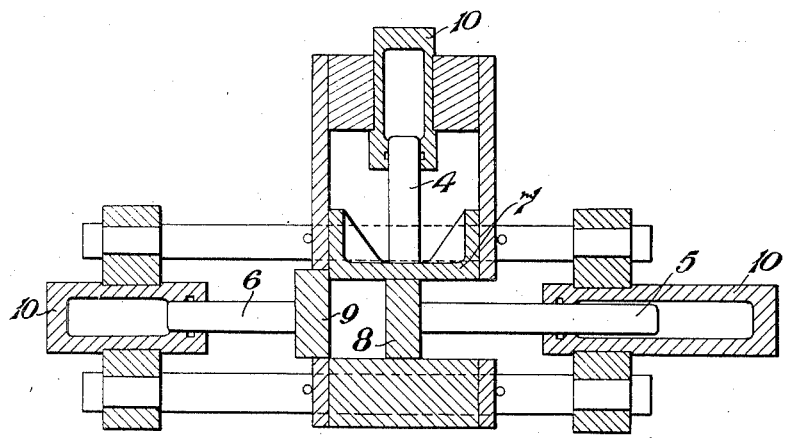

The material to be baled is first preliminarily compressed by means of the filling ram 4, to the cylinder of which the pressure fluid is first admitted, which moves down to the position shown in Figure 6. Pressure fluid is then admitted to the cylinder of the compressing ram. As a result the platen of the compressing ram is moved inwards to the position shown in Figure 7. The material is thus compressed against the platen of the buffer ram which latter ram is prevented from moving under the pressure of the compression ram owing to the pressure fluid being locked in the buffer cylinder by means of non-return valves 45 and 46, see Figure 9.

Figure 8:
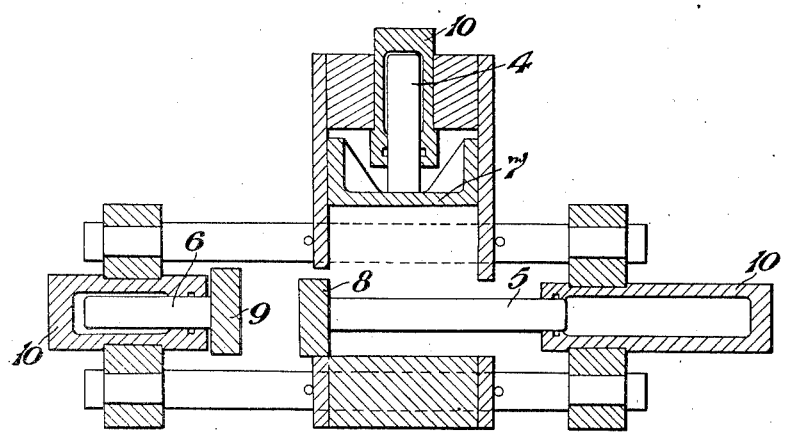

When the material has been sufficiently compressed the valve 16 is operated either manually or automatically to lift the needle valve 35 and release the pressure from the back of the buffer ram. As a consequence the superior pressure exerted by the compressing ram serves to force the buffer ram back and eject the completed bale through the side of the compression chamber thus opened as shown in Figure 8. Simultaneously with the release of the pressure in the buffer ram cylinder the pressure in the cylinder of the filling ram is also released, either by means of the valve 16 or by an additional valve as desired. The filling ram is then returned to its normal position again by means, in the present example of a weight 17$^a$, and subsequently the compression ram is also returned as will hereafter appear.

The operation of the valves 12 and 16 so as to control the admission and release of the pressure fluid to and from the different ram cylinders will best be understood from a reference to Figure 9, and is as follows:—

At the commencement of a bailing operation the valve 31 is on its rear seat 31$^a$ whilst the valve 35 is closed. As a result the pump is no longer allowed to deliver back to the storage tank and therefore delivers through seat 31$^b$ and nonreturn valve 34 to the filling cylinder. When the filling ram has completed its stroke the weighted lever 17 is thrown over automatically as hereinbefore described, thus moving the valve 31 on to its seating 31$^b$. Whilst the lever 17 is thus being thrown over the pressure in the filling cylinder is prevented from escaping by the nonreturn valve 34. Pressure fluid from the pump now passes through seat 31$^a$ to the compressing ram. As the fluid in the buffer cylinder cannot escape through the non-return valve 46 nor through the non-return valve 45 owing to the pump pressure acting upon the top of same, the material is compressed against the platen of the buffer ram. The valve 35 is then opened, either manually when the material has been sufficiently compressed or automatically by means of the tappets 41 carried by the compressing ram. The fluid therefore escapes from the filling and buffer cylinders through the non-return valve 45 and the bale is ejected by the further forward movement of the compressing ram. On the completion of the stroke of the compressing ram the valve 31 is thrown back into its seat 31$^a$ and pressure fluid from the pump escapes back to the storage tank through seat 31$^b$ and valves 34 and 35. The pressure fluid from the compressing cylinder also escapes back to the tank through valve 33 seat 31$^b$ and valves 34 and 35.

The compressing ram is then returned to its original position by means of the weight 18 and the bale falls from between the platens. The compressing ram is connected to the buffer ram by a chain in such a manner that when the compressing ram has returned to a position where the two platens are their normal distance apart it drags the buffer ram back with it until they both occupy their original positions, the buffer cylinder being at the same time filled from the storage tank through the valve 46.

The press is now ready for the next operation, the door 2 being automatically opened in the manner previously described ready for the next filling of material into the compression chamber.

It will of course be appreciated that more than one filling ram may be used if desired the number of filling rams and platens only being limited by the available number of sides to the compression chamber. If desired the filling and buffer rams may be provided with positive stops to limit their forward movements in which case the non-return valves 45 and 46 may be dispensed with.

Although the press just described above is the preferred embodiment of the invention the same may be equally effectively carried into effect by dispensing with the buffer ram, such an arrangement being illustrated somewhat diagrammatically in Figures 14 to 16.

In this modified embodiment of the invention a pair of compressing rams are employed, although one or more may also be used, the cylinders of which are formed in or carried by a block 47 whilst the function of the buffer ram in the first described example is performed by a cross head 48 which is connected rigidly with the compressing cylinder block by means of a pair of columns 49. In the example shown the compressing rams are vertical whilst the filling ram is horizontal, whilst the platens 50 and 51 of the compressing rams and the cross head 48 are provided on their inner edges with grooves 52 to permit of the positioning of lashings when baling material such as cotton, wool and other non-self-binding materials. It will, of course, be appreciated that the platens of the forms of presses constituting the several embodiments of this invention may in every case be provided with these grooves whenever the particular press is intended to bale or bundle cotton, wool and like materials.

In operation, the material is first preliminarily compressed by the filling ram 4 then finally or partially compressed by the compressing rams 5 between the platens 50 and 51, after which the bale is removed from the compression chamber 1 by means of ejecting rams 52 which serve to simultaneously raise both the block 47 and the cross head 48 leaving the compression chamber 1 stationary. Conceivably, however, ejection of the completed bale may be equally well effected by leaving the block 47 and cross head 48 stationary and moving the compression chamber.

A further modified form of the cross head type of press is illustrated in Figures 17, 18, and 19 in which the filling ram is dispensed with compression of the material being effected between the platens 53 and 54 of a single compressing ram 5 and a cross head 55 the cylinder 56 of the compressing ram being connected to the cross head by means of the columns 57. In this modification the platen 54 of the cross head is the lower and normally movable platen, and in the operation of the press this platen is pulled up through the compression chamber 1 towards the stationary platen 53 by the action of the pressure fluid which serves to lift the cylinder of the compressing ram upwards away from the ram which remains stationary until the position illustrated in Figure 18 is reached by which time the material is sufficiently compressed to warrant the bale 1ª being ejected. The ejection of the bale in this example is effected by means of ejection rams 58 which serve to raise the compressing cylinder 56 cross head 55 and ram 5 bodily and as a whole until the bale is clear of the compression chamber and the parts have assumed the position illustrated in Figure 19, when the bale may be released after lashing if such is necessary by releasing the pressure behind the compressing ram 5.

Alternatively the compressing cylinder and cross head 55 may remain stationary during the ejection of the bale and the compression chamber moved to expose the bale the only essential being that the bale at the time of ejection is held between the opposing platen of the cross head and compressing ram.

In Figures 20 and 21 is illustrated a still further modified form of press, in which the cross head shown in Figures 14 to 16 is replaced by a buffer ram. In this example the cylinders 59 and 60 of the compressing and buffer rams are connected together by columns 61, the material being compressed between the respective platens 62 and 63 when the buffer ram is down as shown in Figure 20 the pressure fluid being locked in the buffer cylinder by any suitable means such for example as those described in connection with Figures 1 to 13. To eject the bale the pressure in the buffer cylinder is released thus allowing the compressor ram to continue its upward movement, carrying before it the bale and the buffer ram. In this example the cylinders 59 and 60 are stationary.

Alternatively the bale may be ejected by moving the compression chamber so as to expose the bale whilst held between the two platens.

Figure 23:
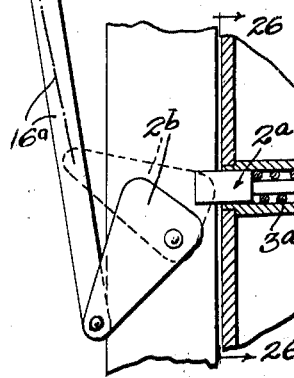
Figure 23 is a view at right angles to Figure 22.

In Figures 22, 23, and 24 is illustrated a slightly modified form of the cross head type of press illustrated in Figures 17 to 19, such modified form comprising a compression ram cylinder 64 and a cross head 65 connected together by means of columns 66, the material being compressed within a compression chamber 1 between platens 67 and 68.

The bales are ejected by means of small ejecting rams 69 which constitute continuations of the columns 66.

The action of these ejecting rams is to raise bodily the cylinder 64 with its ram and platen and cross head 65, also with its platen with the bale in position between the platens to the position shown in Figure 24. In the example shown the ejecting rams 41 cylinders 69 and the compression chamber 1 are stationary. Alternatively the cylinder 64 and the cross head 65 may be stationary whilst the ejecting rams cylinders 69 and compression chamber 1 move to effect the ejection of the bale.

It will of course be appreciated that in all of the examples illustrated the control of the various operations may be effected either manually or automatically without departing from the invention the essential and broad feature of which is the maintenance of the bale between opposing platens during and after its ejection from the compression chamber.

What we claim is:—

1. A baling press comprising in combination a compression chamber adapted to be filled with the material to be baled, means for compressing such material comprising a filling ram for preliminarily compressing the material, a compression ram arranged at right angles to the filling ram for finally compressing the material, and a buffer ram disposed diametrically opposite to the compression ram, hydraulic cylinders in which each of said rams work, valve means controlling the supply of pressure fluid to and from said cylinders, said valve means passing fluid first to the cylinders of the filling ram and the buffer ram simultaneously and subsequently to the compression ram whereby the buffer ram is held stationary by the fluid locked behind it while the compression ram is moved inwards towards it to effect the compression of the material and means for releasing the pressure on the buffer ram when the material has been compressed to permit the compression ram and the buffer ram to move together through the compression chamber carrying the completed bale between them.

2. A baling press comprising a compression chamber adapted to be loaded with the material to be baled, means for compressing such material comprising a compression ram and a buffer ram arranged on opposite sides of the compression chamber, means for normally maintaining the buffer ram stationary, means for moving the compression ram inwards towards the buffer ram to effect the compression of the material and means for releasing the buffer ram when the material has been compressed to permit both rams to move together through the compression chamber carrying the completed bale between them.

3. A baling press comprising a compression chamber having an opening through which the material is inserted to be baled, a hinged lid serving to cover and uncover said opening, a catch for holding said lid in the open position, hydraulic means for compressing the material within said compression chamber, valve means controlling the supply of pressure fluid to said hydraulic compressing means, means operatively connecting said valve means to said catch whereby said catch is released automatically when said valve means is operated to admit pressure fluid to said hydraulic compressing means so as to allow said lid to close, and means for positively and automatically turning said lid about its hinge into the open position when the material has been compressed into a bale.

4. A baling press comprising a compression chamber having an opening through which the material is inserted to be baled, a hinged lid serving to cover and uncover said opening, a catch for holding said lid in the open position, hydraulic means for compressing the material within said compression chamber, valve means controlling the supply of pressure fluid to said hydraulic compressing means, means operatively connecting said valve means to said catch whereby said catch is released automatically when said valve means is operated to admit pressure fluid to said hydraulic compressing means so as to allow said lid to close, means for positively and automatically turning said lid about its hinge into the open position when the material has been compressed into a bale and means operatively connecting the valve means to said lid whereby said lid automatically releases the pressure fluid from the hydraulic compressing means when said lid has been turned into the open position.

5. A baling press comprising a compression chamber adapted to be filled with the material to be baled, hydraulic means for compressing the material including a compression ram and a buffer ram, means controlling the supply of pressure fluid of said rams, means for holding the buffer ram stationary while the compression ram is moved inward towards it to effect the compression of the material and means for releasing the buffer ram when the material has been compressed to permit the compression ram and the buffer ram to move together through the compression chamber carrying the completed bale between them.

6. A baling press comprising a compression chamber adapted to receive the material to be baled, means for compressing said material within the compression chamber comprising three hydraulic rams, a filling ram, a compression ram and a buffer ram arranged opposite to the compression ram, valve means controlling the supply of pressure fluid to the hydraulic rams, said valve means admitting the pressure fluid first to the filling ram and the buffer ram simultaneously, and means operatively connecting the filling ram to said valve means whereby when the filling ram has completed its stroke it effects automatically the operation of the valve means to cause the pressure fluid to be admitted to the compression ram.

7. A baling press comprising a compression chamber adapted to be filled with the material to be baled, a filling ram adapted preliminarily to compress the material within the compression chamber, a compression ram adapted finally to compress the material into a bale, a buffer ram arranged opposite to the compression ram and adapted to support the material while being compressed by the compressing ram, and means for releasing the buffer ram whereby the same is caused to move with the compression ram with the bale between them clear of the compression chamber.

8. A baling press comprising a compression chamber adapted to be filled with the material to be baled, hydraulic means for compressing the material within the compression chamber into a bale comprising a compression ram and a buffer ram arranged opposite to each other, valve means for controlling the supply of pressure fluid to said hydraulic rams and means operatively connecting said valve means to one of the hydraulic rams whereby said valve means is operated automatically when the material has been sufficiently compressed to release the pressure fluid from the buffer ram and permit the two rams to carry the bale between them out of the compression chamber.

9. A baling press comprising a compression chamber having an opening through which the material is inserted, a hinged and longitudinally movable lid serving to cover and uncover said opening, means under which the free end of the lid is adapted to engage for holding the lid in the closed position, means for automatically withdrawing the free end of the lid from under the engaging means to release the name, means for turning the lid automatically upwards about its hinge into the open position and means for compressing the material within the compression chamber into a bale.

10. A baling press comprising a compression chamber having an opening through which the material is inserted to be baled, a hinged lid serving to cover and uncover said opening, a hydraulic filling ram for preliminarily compressing the material within said compression chamber, a further two hydraulic rams arranged on opposite sides of the compression chamber and at right angles to the filling ram one of said further rams being a compression ram for finally compressing the material into a bale and the other ram being a buffer ram serving to resist the pressure of the compression ram while the material is being finally compressed, cylinders associated with said hydraulic rams and in which they work, valve means controlling the admission of pressure fluid to said cylinders, means for manually operating said valve means first to admit pressure fluid to the cylinders of the filling ram and the buffer ram simultaneously, means operatively connecting said valve means to the filling ram whereby when the filling ram has completed its stroke said valve means is operated automatically to admit pressure fluid to the cylinder of the compression ram, and means operatively connecting said valve means to said compression and buffer rams whereby when the compression ram has completed the compression of the material into a bale the pressure fluid is allowed to escape from the cylinders of the buffer ram and the filling ram so as to permit said buffer ram to move with and under the pressure of the compression ram to carry the bale between them out of the compression chamber and finally to release the pressure fluid from the cylinder of the compression ram so as to remove the pressure of such ram on the bale.

11. A baling press comprising a compression chamber having an opening through which the material is inserted to be baled, a hinged lid serving to cover and uncover said opening, a hydraulic filling ram for preliminarily compressing the material within said compression chamber, a further two hydraulic rams arranged on opposite sides of the compression chamber and at right angles to the filling ram one of said further rams being a compression ram for finally compressing the material into a bale and the other ram being a buffer ram serving to resist the pressure of the compression ram while the material is being finally compressed, cylinders associated with said hydraulic rams and in which they work, valve means controlling the admission of pressure fluid to said cylinders, means for manually operating said valve means first to admit pressure fluid to the cylinders of the filling ram and the buffer ram simultaneously, means operatively connecting said valve means to the filling ram whereby when the filling ram has completed its stroke said valve means is operated automatically to admit pressure fluid to the cylinder of the compression ram, means for automatically closing the lid simultaneously with the admission of pressure fluid to the cylinders of the filling ram and the buffer ram, means connecting the lid to one of said rams whereby the lid is automatically opened as said ram completes its operative movement, and means operatively connecting said valve means to said compression and buffer rams whereby when the compression ram has completed the compression of the material into a bale the pressure fluid is allowed to escape from the cylinder of the buffer ram so as to permit said buffer ram to move with and under the pressure of the compression ram to carry the bale between them out of the compression chamber and finally to release the pressure fluid from the cylinder of the compression ram so as to remove the pressure of such ram on the bale.

In witness whereof we affix our signatures.

FRANK HATHORN TOWLER.
JOHN MAURICE TOWLER.